June 8, 1943.  T. L. THURLOW ET AL  2,321,051
STABILIZED HORIZON
Filed Feb. 12, 1941
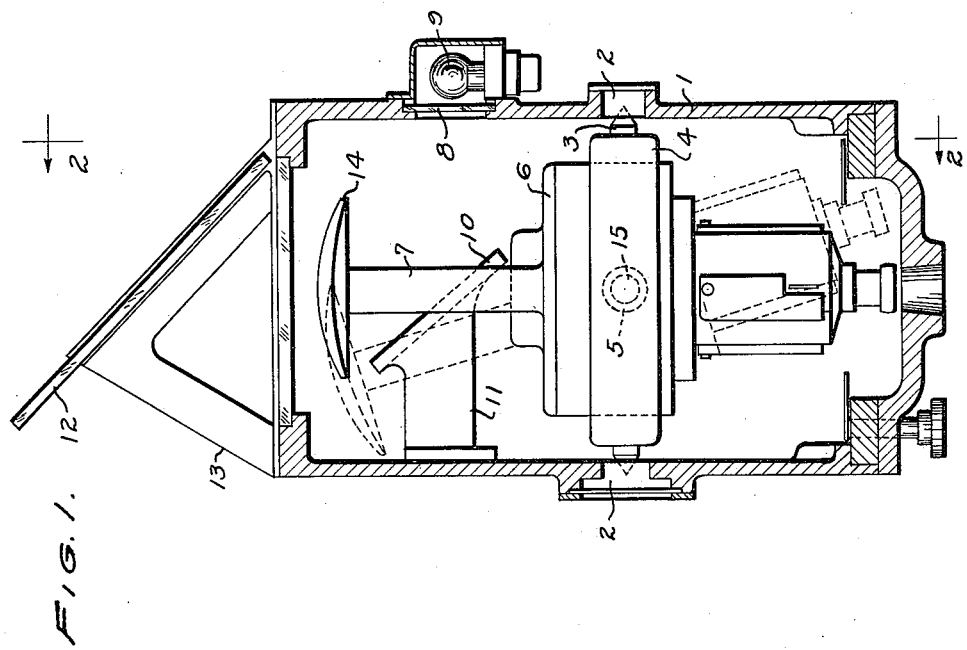
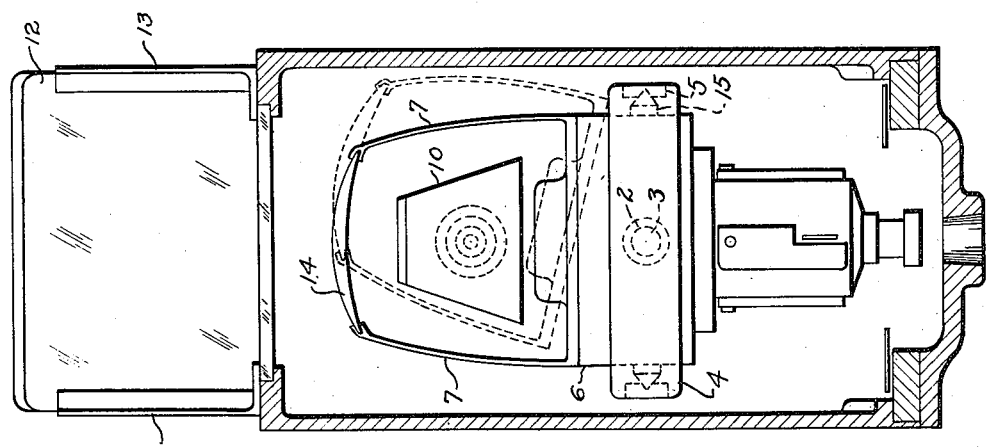
INVENTORS
THOMAS L. THURLOW
SAMUEL M. BURKA
ATTORNEYS Patented June 8, 1943

2,321,051

UNITED STATES PATENT OFFICE 2,321,051

STABILIZED HORIZON

Thomas L. Thurlow and Samuel M. Burka, Dayton, Ohio

Application February 12, 1941, Serial No. 378,583

5 Claims. (Cl. 88—1)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a gyroscopically stabilized horizon and more particularly to an apparatus for maintaining an image of a gyroscopically established reticle in an observable position, the image appearing to be at an infinite distance with respect to the eye of the observer.

In navigation and particularly in the navigation of aircraft, it is desirable to have a horizontal reference point which maintains its apparent horizontal position regardless of the position of the eye of the observer. The observer or navigator may then make use of the artificial horizon for astronomical observation purposes, for instance with a sextant.

In the drawing:

Figure 1 is a sectional view, the rotor-housing and lens being shown in dotted lines in a relatively tilted position with respect to the housing.

Figure 2 is a sectional view taken generally along the lines 2—2 of Figure 1, the lens being shown in dotted lines in a relatively tilted position with respect to the housing.

Referring to the drawing, a casing 1 is provided with bearings 2 for operatively receiving pivot bearings 3. Pivot bearings 3 are integral with gimbal ring 4 and serve to pivotally mount that ring with respect to the casing. Gimbal ring 4 is provided with suitable bearings 5 for operatively receiving bearings 15 integral with rotor-housing 6. Housing 6 supports and rotates by a suitable well-known mechanism (not shown) a vertical-seeking, self-erecting, gyro rotor which maintains the housing vertical regardless of tilting of the casing. Carried by the housing 6 by means of arms 7 is a lens 14 having a focal distance equal to the distance of the lens from its axis of pivotation established by bearings 5.

Carried by housing 1 is a member 8 of translucent material having a suitable reticle incorporated therein. This reticle may comprise any suitable marking, such as a cross, or the like. Light 9 serves to project an image of the reticle on to mirror 10 from which it is reflected to lens 14. Mirror 10 is held by bracket 11 at 45° with respect to the longitudinal axis of the casing. The reticle is placed at the principal focus of lens 14 or in other words at a distance from the lens equal to the principal focal distance of the lens. This distance, as previously pointed out, is also the distance from the lens 14 to the point of rotation of the rotor-housing. Mirror 12 is arranged at 45° with respect to the longitudinal axis of the housing and serves to change the direction of the reticle-image-carrying rays emerging from the lens from the vertical to the horizontal. Obviously this mirror may be placed at any preselected angle with respect to the longitudinal axis of the casing and may be made adjustable with respect thereto. The relationship established by this arrangement of elements is such that bundles of rays carrying the image of the reticle always emerge from the lens 14 in parallel bundles, and from reflector 12 in parallel bundles which are horizontal. This relationship is maintained regardless of tilting of the housing with respect to the lens or of the position of the observer's eye with respect to the mirror 12.

In operation, the casing is mounted vertically with respect to the longitudinal axis of the airplane. Since the reticle is placed at the principal focus of the lens 14, the image of the reticle as transmitted by mirror 10 emerges from lens 14 in parallel bundles. The effect is the same as placing the reticle at an infinite distance from the eye of the observer. The mirror 12 changes the direction of the reticle-image-carrying bundles of rays from vertical to horizontal. Since the image of the reticle is seen at infinity, the direction to the image is independent of the eye position. The navigator may use this image as an artificial horizon when making sextant observations for determining position in space.

Although but a single preferred embodiment of the invention has been described, it is to be understood that changes and modifications may be made in the device without departing from the spirit and substance of the invention. Various modifications and changes may be made by those skilled in the art without departing from the inventive concept, it being intended that the invention be limited only by the scope of the appended claims.

We claim:

1. In combination, a casing, a lens, means for mounting said lens on said casing with freedom for universal movement about a substantially horizontal plane spaced from said lens a distance equal to the principal focal distance of the lens, means for gyroscopically stabilizing said lens, a reticle carried by said casing at a distance from the lens such that the optical path from the reticle to the lens is equivalent to the principal focal distance of the lens, a mirror for transmitting light rays carrying an image of said reticle to said lens and a mirror carried by said casing for changing the direction of the light rays emanating from said lens from vertical to horizontal.

2. In combination, a casing, a gimbal ring pivotally carried by said casing, a gyro-rotor and housing pivotally carried by said gimbal ring, a lens carried by said rotor housing and spaced from the axis of pivotation of said gimbal ring and housing a distance equal to the principal focal distance of the lens, a reticle carried by said housing in fixed relation thereto, the reticle being placed at such a distance from the lens that the optical path from the reticle to the lens is equal to the principal focus of the lens, and means for transmitting light rays carrying an image of said reticle to said lens.

3. In combination, a casing, a lens, said lens being gyroscopically stabilized and mounted for universal movement about an axis of pivotation spaced from the lens a distance equal to the principal focal distance of the lens, a reticle mounted in said casing in fixed relation thereto at such a distance from the lens that the optical path from the reticle to the lens is equal to the principal focal distance of the lens, and means for transmitting image-carrying light rays from the reticle to said lens.

4. A stabilized horizon comprising a casing, a recticle fixedly carried directly by said casing, a gyroscopically stabilized lens carried by said casing with freedom for universal pivotal movement, the radius of pivotation of said lens and the optical distance of the reticle from said lens being equal to the principal focal distance of the said lens, means for transmitting light rays carrying an image of said reticle to said lens and means for transmitting light rays carrying an image of said reticle emanating from said lens into an observable position.

5. In combination, a casing, a pivotally mounted rotor-housing gyroscopically stabilized by a vertical-seeking gyro, a lens carried by said rotor-housing, a reticle carried by said casing, the radius of pivotation of the mounting of said lens and the optical distance of the reticle from said lens being equal to the principal focal distance of said lens, means for transmitting light rays carrying an image of said reticle to said lens, and means for angularly changing the direction of the image-carrying rays from vertical to horizontal.

THOMAS L. THURLOW.
SAMUEL M. BURKA.